(12) United States Patent
Abram et al.

(10) Patent No.: US 6,874,037 B1
(45) Date of Patent: Mar. 29, 2005

(54) METHOD AND APPARATUS FOR SYNCHRONIZING DEVICE INFORMATION

(75) Inventors: Philip Michael Abram, Warwick, NY (US); Marc Beckwitt, San Clemente, CA (US); Gregory D. Gudorf, Mahwah, NJ (US); Brian Raymond, San Diego, CA (US); Brian Siegel, Washingtonville, NY (US); Christopher M. Tobin, Central Valley, NY (US); Kazuaki Iso, Oradell, NJ (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 660 days.

(21) Appl. No.: 09/596,527

(22) Filed: Jun. 19, 2000

(51) Int. Cl.[7] .............................................. G06F 15/16
(52) U.S. Cl. ..................................... 709/248; 455/456
(58) Field of Search ................................ 709/248, 201, 709/246; 701/29; 370/332, 401, 503, 216, 347; 375/340, 503, 354; 340/539, 636, 7.23, 825; 342/174, 29, 357; 320/115; 707/203, 10; 713/500; 455/456, 517, 419, 436

(56) References Cited

U.S. PATENT DOCUMENTS

| | | | |
|---|---|---|---|
| 5,392,390 A | | 2/1995 | Crozier ........................ 395/161 |
| 5,402,448 A | * | 3/1995 | Marko et al. ................ 375/340 |
| 5,416,780 A | * | 5/1995 | Patel ........................... 370/347 |
| 5,539,393 A | | 7/1996 | Barfod ..................... 340/825.52 |
| 5,598,166 A | * | 1/1997 | Ishikawa et al. ............. 342/357 |
| 5,666,530 A | | 9/1997 | Clark et al. .................. 395/617 |
| 5,694,120 A | * | 12/1997 | Indekeu et al. ............. 340/7.23 |
| 5,721,733 A | * | 2/1998 | Wang et al. ................. 370/332 |
| 5,748,737 A | | 5/1998 | Daggar ......................... 380/24 |
| 5,838,659 A | * | 11/1998 | Kainulainen ................. 370/216 |
| 5,848,396 A | | 12/1998 | Gerace .......................... 705/10 |
| 5,857,201 A | | 1/1999 | Wright, Jr. et al. .......... 707/104 |

(Continued)

OTHER PUBLICATIONS

Adaptive timing synchronisation scheme for short–range Bluetooth network ; Young–Hwan You et al; IEEE 2000.*
BlueSky: A Cordless Networking Solution for Palmtop— Bhagwat, Korpeoglu.; www–2.cs.cmu.edu/afs/cs.edu/user/satya/Web/MCSALINK/PAPERS/bhagwat99.pdf.*
HomRF and Bluetooth: A Wirless Data communictions Revolution in the Making, Victor Bahl, www.research.microsoft.com/~bahl/present/stanford99.pdf.*

*Primary Examiner*—Thong Vu
(74) *Attorney, Agent, or Firm*—Mayer Fortkort & Williams, PC; Michael P. Fortkort, Esq.; Karin L. Williams, Esq.

(57) ABSTRACT

Two electronic devices automatically perform a synchronization session when one of the electronic devices is brought in proximity to the other electronic device. The synchronization session is initiated without user intervention based simply on the fact that the two devices have recently been brought within a predetermined distance of each other. The two electronic devices communicate in a wireless manner. The two devices may determine that they are within a predetermined distance of each other using global positioning technology, via which one of the devices determines its own position and compares it to a known position of the other electronic device. Alternatively, one of the electronic devices may output a low level signal that can be received by the other electronic device when within a certain range. Once the low level signal is received, the recipient of the low level signal outputs a stronger signal to ensure that it is received by the other electronic device requesting a synchronization session, which once established enables synchronization of information between the two devices.

10 Claims, 6 Drawing Sheets

U.S. PATENT DOCUMENTS

| | | | |
|---|---|---|---|
| 5,867,688 A | 2/1999 | Simmon et al. | 395/500 |
| 5,890,152 A | 3/1999 | Rapaport et al. | 707/6 |
| 5,928,329 A | 7/1999 | Clark et al. | 709/227 |
| 5,956,716 A | 9/1999 | Kenner et al. | 707/10 |
| 5,963,916 A | 10/1999 | Kaplan | 705/26 |
| 5,974,238 A * | 10/1999 | Chase, Jr. | 709/248 |
| 5,974,312 A * | 10/1999 | Hayes, Jr. et al. | 455/419 |
| 5,978,799 A | 11/1999 | Hirsch | 707/4 |
| 5,991,306 A | 11/1999 | Burns et al. | 370/429 |
| 6,014,654 A | 1/2000 | Ariyoshi | 706/62 |
| 6,055,542 A | 4/2000 | Nielsen et al. | 707/104 |
| 6,055,566 A | 4/2000 | Kikinis | 709/219 |
| 6,070,158 A | 5/2000 | Kirsch et al. | 707/3 |
| 6,122,230 A | 9/2000 | Scibora | 369/32 |
| 6,130,892 A * | 10/2000 | Short et al. | 370/401 |
| 6,133,867 A * | 10/2000 | Eberwine et al. | 342/29 |
| 6,192,391 B1 * | 2/2001 | Ohtani | 709/201 |
| 6,255,800 B1 * | 7/2001 | Bork | 320/115 |
| 6,295,541 B1 * | 9/2001 | Bodnar et al. | 707/203 |
| 6,323,775 B1 * | 11/2001 | Hansson | 340/636 |
| 6,327,469 B1 * | 12/2001 | Gaastra | 455/436 |
| 6,356,192 B1 * | 3/2002 | Menard et al. | 340/539 |
| 6,408,232 B1 * | 6/2002 | Cannon et al. | 701/29 |
| 6,421,733 B1 * | 7/2002 | Tso et al. | 709/246 |
| 6,470,189 B1 * | 10/2002 | Hill et al. | 455/517 |
| 6,493,550 B1 * | 12/2002 | Raith | 455/422 |
| 6,553,236 B1 * | 4/2003 | Dunko et al. | 455/456 |
| 6,571,245 B2 * | 5/2003 | Hunag et al. | 707/10 |

* cited by examiner

METHOD AND APPARATUS FOR SYNCHRONIZING DEVICE INFORMATION

BACKGROUND OF THE INVENTION

The present invention relates generally to methods and apparatuses for synchronizing device information, and more particularly to a method and apparatus for synchronizing device information between two or more electronic devices, including portable electronic devices, such as laptops, palm pads, consumer electronic devices, etc.

Synchronizing information between electronic devices is generally known. For example, U.S. Pat. No. 5,928,329 discloses a system for automatic synchronization of common files between a portable computer and a host computer. This system enables information synchronization between a portable computer and a desktop computer, in which the synchronization occurs either based on a time schedule or during a boot-up sequence or when the portable computer is physically connected to the cradle, which in turn is directly connected to the host computer.

U.S. Pat. No. 5,392,390 discloses another method for reconciling data between two computers.

There are many applications for such information synchronization. For example, certain PALM PILOT based contacts information can be synchronized with personal computer-based OUTLOOK contacts information. However, there are some problems with this process.

One problem is that the synchronization process is user initiated, so the process does not always get completed in a timely fashion. Another is that the interfacing elements, such as cables and connectors, may be required—a disincentive to synchronization. Yet another problem is that common data fields can be updated in both environments prior to synchronization, which may facilitate the destruction of some data.

The present invention is therefore directed to the problem of simplifying information synchronization between multiple electronic devices.

SUMMARY OF THE INVENTION

The present invention solves this and other problems by automatically triggering information synchronization when one electronic device is brought in proximity of or within a predetermined zone of another electronic device without any user intervention.

According to the present invention, one exemplary embodiment of a method for detecting the proximity of another electronic device to be synchronized includes determining a position of a first electronic device and comparing the position to a known position of a second electronic device. If the position of the first electronic device lies within a predetermined distance of the known position of the second electronic device then a synchronization session can be initiated.

According to the present invention, another exemplary embodiment of a method for detecting the proximity of another electronic device includes transmitting a low level signal (e.g., one a periodic basis) from one of the electronic devices, and detecting the low level signal with the other of the electronic devices. Upon receipt of the low level signal, one of the electronic devices transmits a synchronization session initiation signal.

According to yet another aspect of the present invention, a method for initializing two electronic devices that synchronize information when brought in proximity to each other includes determining a location of a fixed one of the two electronic devices by bringing a portable one of the two electronic devices in close proximity to the fixed one of the two electronic devices and determining a location of the portable one of the two electronic devices while in close proximity to the fixed one of the two electronic devices and storing the determined location of the portable one of the two electronic devices as a known location of the fixed one of the two electronic devices.

According to yet another aspect of the present invention, an apparatus for enabling synchronization of information between a first electronic device in which the apparatus is disposed and a second electronic device includes at least a location detector, a processor and a transceiver. The location detector determines a position of the first electronic device. The processor, which is coupled to the location detector, compares the position of the first electronic device relative to a position of the second electronic device. The transceiver, which is coupled to the processor, initiates a wireless communications session with the second electronic device if the processor determines that the position of the first electronic device lies within a predetermined distance of the second electronic device. The transceiver also transmits synchronization information between the first and second electronic devices during the wireless communications session.

According to yet another aspect of the present invention, an apparatus for enabling synchronization of information between a first electronic device in which the apparatus is disposed and a second electronic device includes a transmitter, a receiver and a processor. The transmitter transmits a low level signal that can be received by the second electronic device if within a predetermined distance. The receiver receives a confirmation signal indicating that the low level signal was received by the second electronic device. The processor, which is coupled to the transmitter and receiver, outputs synchronization information to the second electronic device via the transmitter upon receipt of the confirmation signal.

DETAILED DESCRIPTION

The present invention is described herein in connection with a personal digital assistant (PDA) to personal computer (PC) embodiment, but is it not limited to this environment. For example, various electronic devices, whether they are PDAs, digital wallets, telephones, consumer electronic devices, set top boxes, remote control devices, radios, televisions, etc. may be synchronized with various other electronic devices, such as personal computers, other PDAs, servers, consumer electronic devices, radios, televisions, car stereos, etc. It is even possible to synchronize two portable devices or two non-portable devices with the present invention. Furthermore, it is possible to synchronize multiple devices with one or multiple other devices.

Moreover, the data to be synchronized can be any data or information, including but not limited to telephone numbers, personal information, login identification, authentication information, user preferences, vehicle preferences, television preferences, visual preferences, lighting preferences heating/air conditioning settings, personal comfort settings, hot water settings, mouse settings, user interface settings, etc. For example, a person's preferences (e.g., radio station presets, volume settings, hearing impaired audio settings, audio equalization settings, television channel preferences, telephone calling list, telephone long distance carrier, computer login identification and password information to enable "hot logins", etc.) carried in a digital wallet may be synchronized with any consumer electronic devices when the person enters into the proximity of such devices.

At this point, it is worthy to note that any reference herein to "one embodiment" or "an embodiment" means that a particular feature, structure, or characteristic described in connection with the embodiment is included in at least one embodiment of the invention. The appearances of the phrase "in one embodiment" in various places herein are not necessarily all referring to the same embodiment.

Exemplary Apparatus

Figure 1:
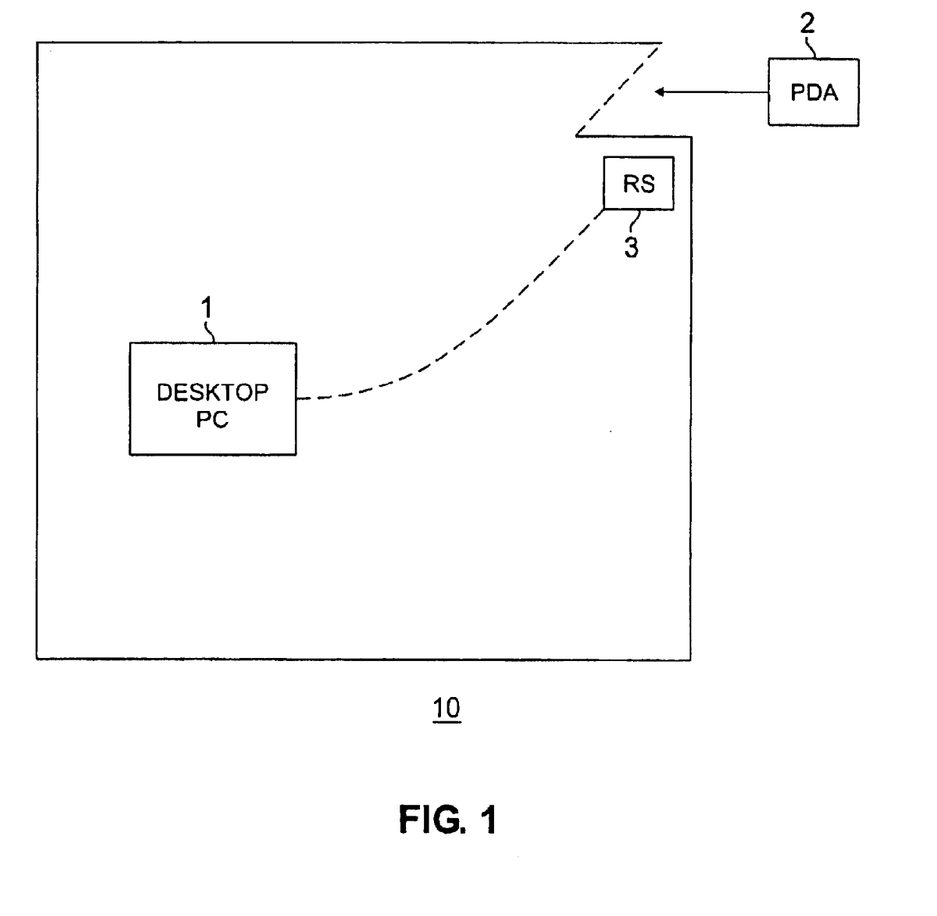
FIG. 1 depicts an exemplary embodiment of an apparatus according to one aspect of the present invention.

Referring to FIG. 1, shown therein is an exemplary embodiment of a system 10 implementing one aspect of the present invention. A first electronic device 2, such as a PDA, is brought in proximity to a second electronic device 1, such as a desktop computer. In some cases, the second electronic device may be considered a "fixed" device, however, the second electronic device may also be a portable device. Once the first electronic device 2 comes within a predetermined range of the second electronic device 1, one of the two devices initiates a synchronization session to attempt to synchronize data without any user intervention triggering the initiation.

Figure 2:
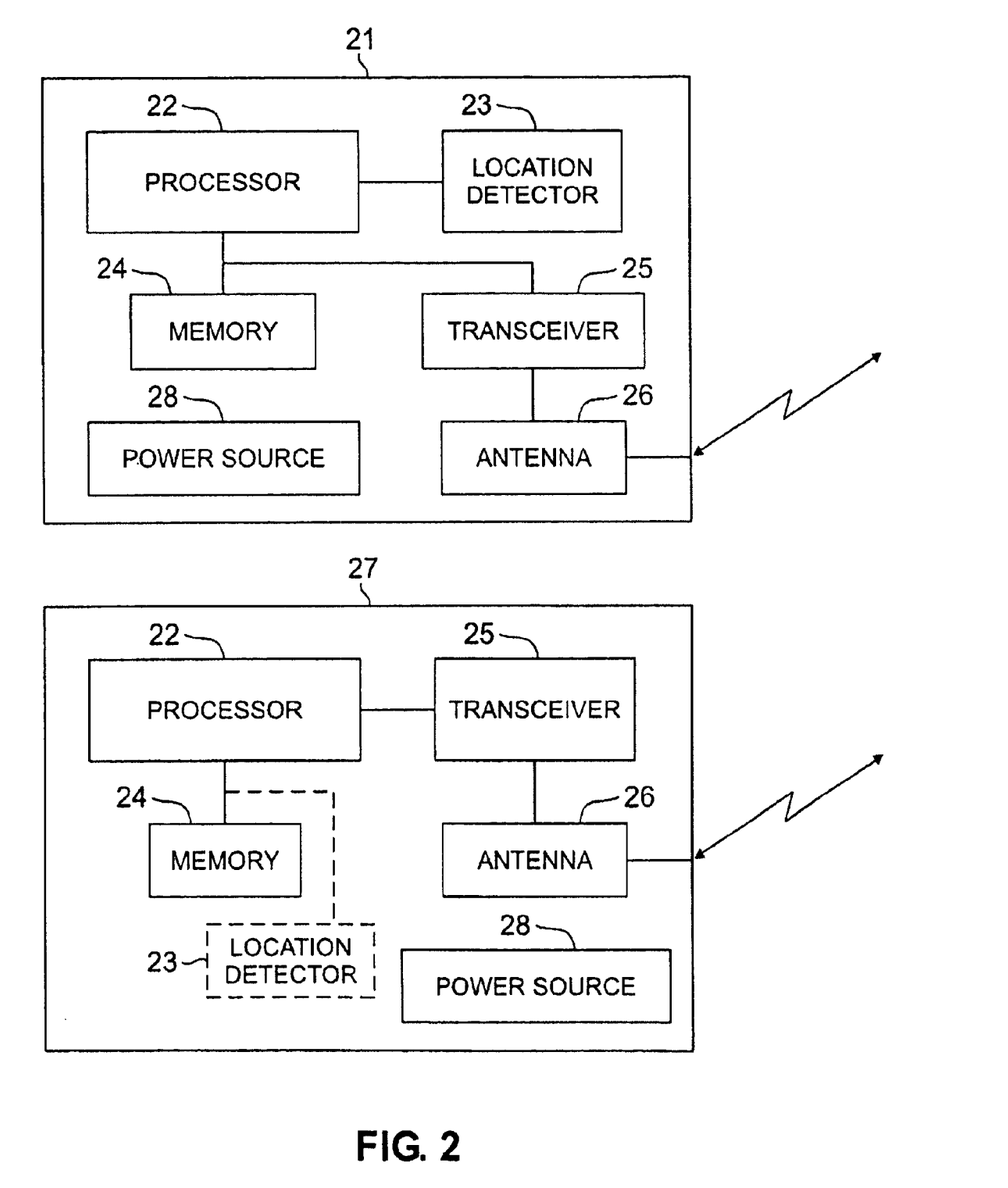
FIG. 2 depicts an exemplary embodiment of another apparatus according to another aspect of the present invention.

Turning to FIG. 2, shown therein is a block diagram of exemplary embodiments of the two electronic devices 1, 2. Each device 21, 27 includes a processor 22, memory 24, a power source 28, antenna 26, and a transceiver 25. At least one of the devices includes a location detector 23 in some configurations. These various components are typically interconnection via a bus. The location detector 23 in device 27 is shown as a dotted line indicating that it is optional.

To prevent undue battery drain, preferably the device that is coupled to an AC power source rather than a battery should be the one of the two electronic devices that attempts to take active steps to detect the presence of the other electronic device to initiate a synchronization session. For example, if one of the two devices periodically emits a signal, such as an RF signal or IR signal, which signal the other device detects, then the devices emitting the signal should preferably be coupled to a source of constant power rather than a battery.

One of the devices (e.g., a desktop computer 1) may detect the presence of the other device (e.g., a PDA 2), through the use of an electronic signal identifier, such as an RF or IR homing signal. In this case, one of the electronic devices (perhaps the fixed device) outputs on some periodic basis (such as every minute, 5 minutes, 30 minutes, etc.) a very low-level, pulsed RF signal that can only be received from a predetermined distance, such as for example, 30 feet, 20 feet or 10 feet. This ensures that a synchronization attempt will only occur when the two devices are sufficiently close. Once the other device is detected, the other device increases its transmission signal so that the synchronization data will be successfully received. By increasing the level of the transmission several decibels, the stronger signal will be received with higher likelihood and less errors. By locating the homing signal in the fixed device or whichever device is coupled to an AC power source rather than a battery, the battery in the portable device will not be required to support a regular albeit low-level and periodic transmission.

Alternatively, a fixed detector 3 (see FIG. 1), such as a remote receiver, may detect the presence of the device 2 as it passes through an entrance to the fixed device 1, in which entrance the fixed detector 3 is disposed. In this embodiment, the fixed detector 3 is coupled to the other electronic device 1 and informs the other electronic device 1 of the existence of the one electronic device 2, thereby initiating a synchronization session. One advantage of this embodiment is that several devices may share the same fixed detector via a network, to which each of a plurality of fixed detectors is coupled and to which multiple electronic devices are also coupled. This enables multiple electronic devices to be informed of the presence of a new portable electronic device, thereby enabling the appropriate one of the multiple electronic devices to be synchronized with the new portable electronic device. This may be suitable in large office settings where numerous portable electronic devices may be present, thereby preventing undue attempts to initiate synchronization sessions. Moreover, once one of the multiple devices is synchronized with the portable device, all other ones of the multiple devices may be subsequently synchronized via the network to which each of the multiple devices is coupled. Thus, only one synchronization session need be performed over the wireless link, yet all devices on the network can be simultaneously updated or synchronized. Furthermore, other portable electronic devices can then be synchronized with the first portable device when they are synchronized with one of the multiple devices.

Figure 3:
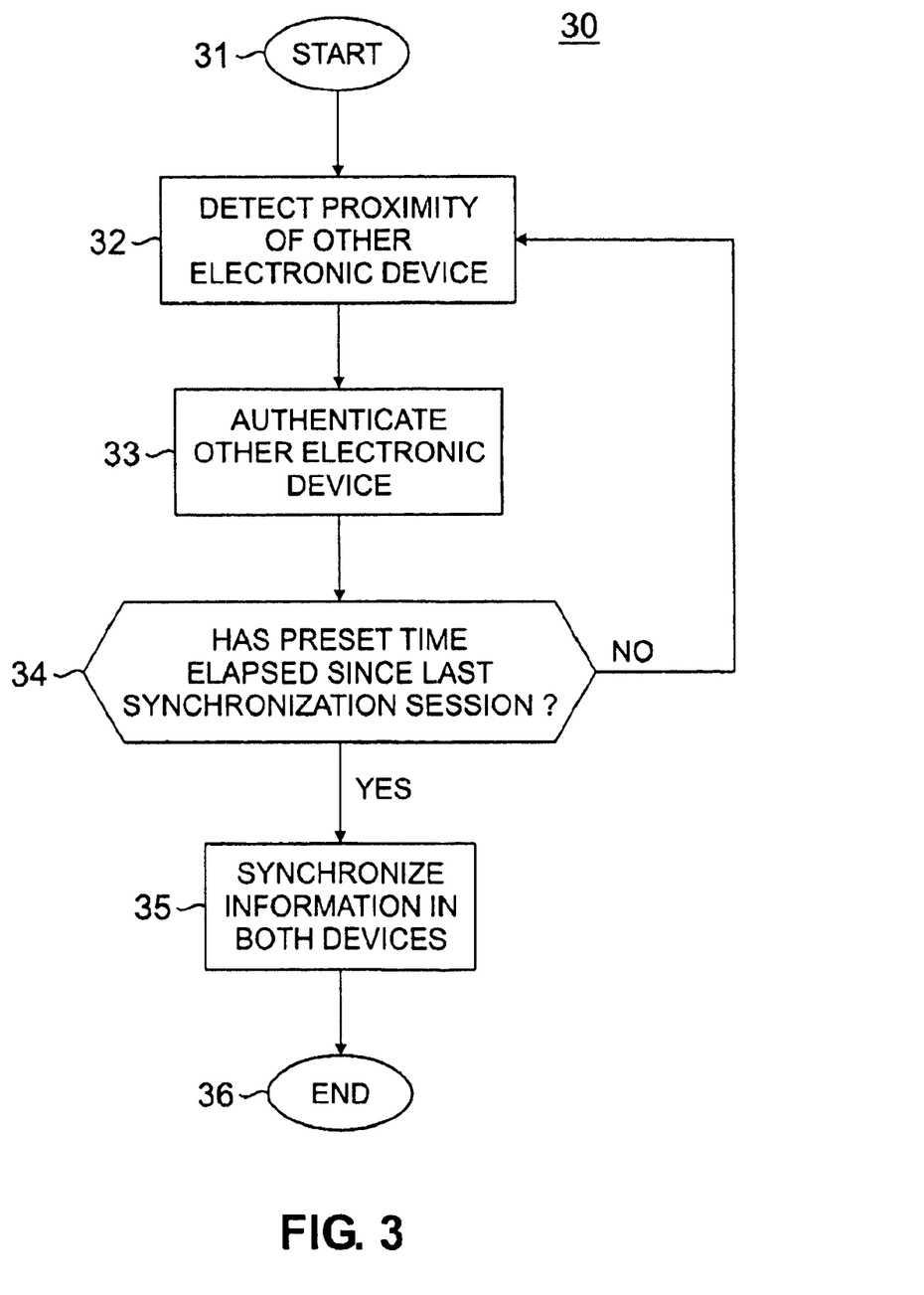
FIG. 3 depicts a flow chart of an exemplary embodiment of a method according to another aspect of the present invention.

Turning to FIG. 3, shown therein is an exemplary embodiment of a method 30 for automatically performing synchronization between two electronic devices. The process begins (step 31) when one of the electronic devices detects that it is in the proximity of the other electronic device (step 32). The other device is first authenticated (step 33). Next, in step 34 the device determines whether a preset time (e.g., one day, one hour, 10 minutes, etc.) has elapsed since a last synchronization session with this device. If so, one of the devices initiates a synchronization session (step 35), after which the process ends (step 36). If the preset time has not elapsed, the process returns to step 32.

Figure 4:
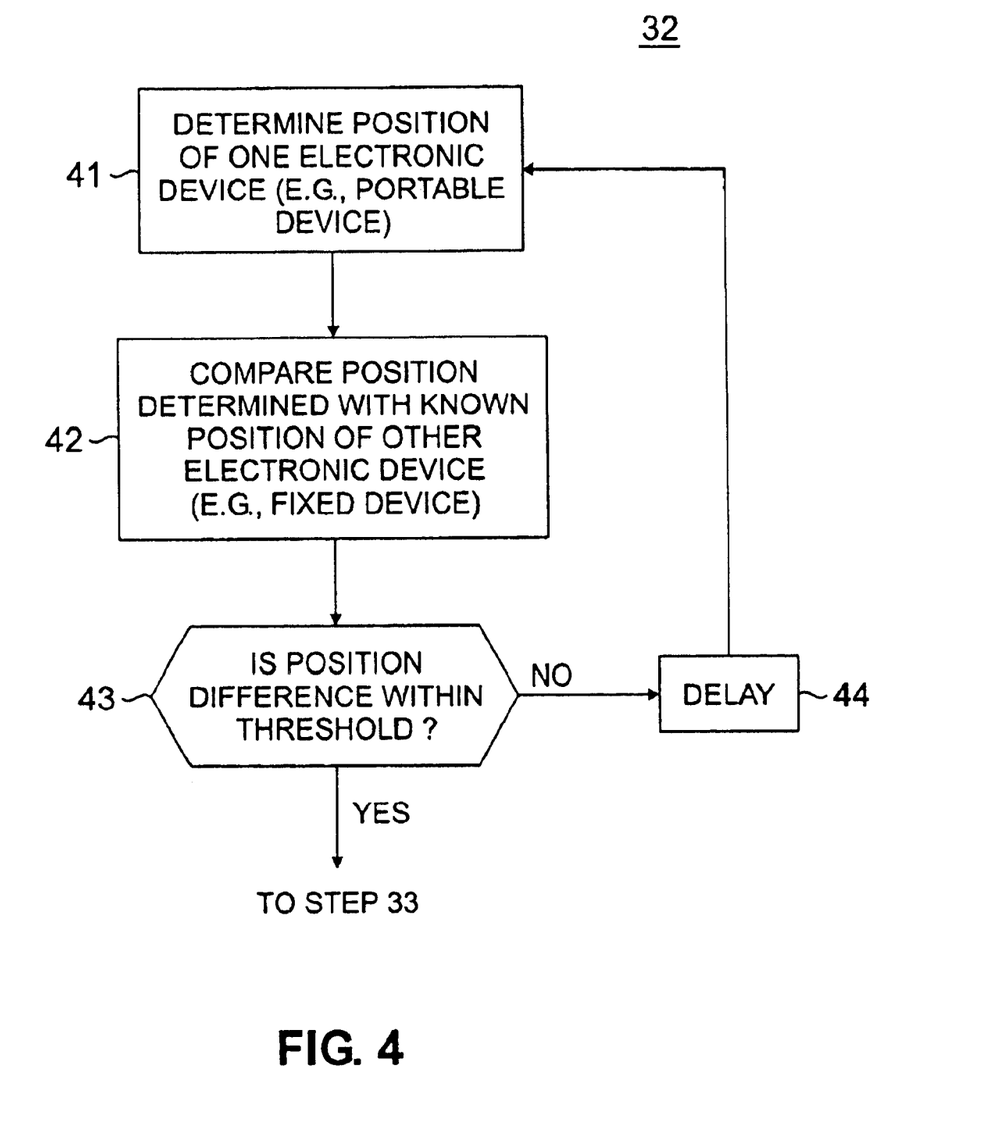
FIG. 4 depicts a flow chart of an exemplary embodiment of a method for performing one of the steps included in the flow chart of FIG. 3 according to yet another aspect of the present invention.
Figure 5:
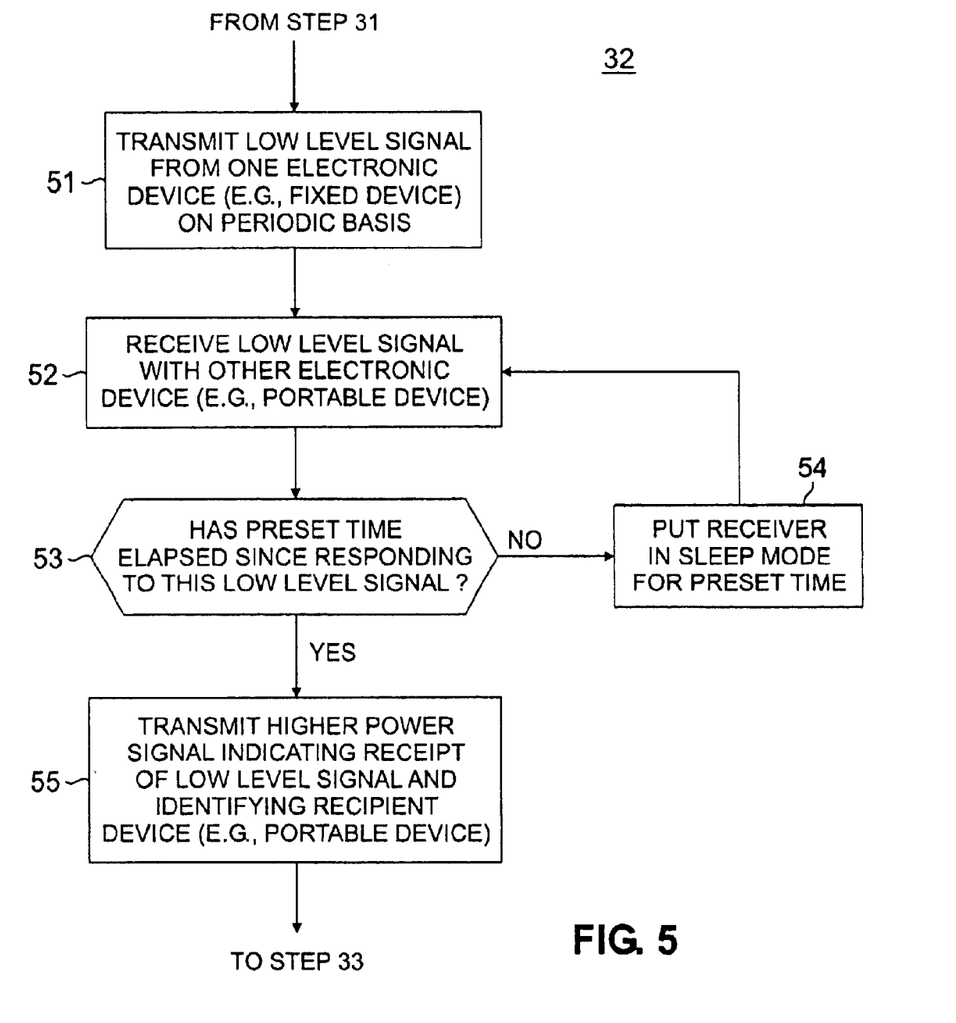
FIG. 5 depicts a flow chart of an exemplary embodiment of a method for performing one of the steps included in the flow chart of FIG. 3 according to yet another aspect of the present invention.

FIGS. 4 and 5 depict various embodiments for performing the determination as to whether one device is within the proximity of the other device. Other techniques are possible.

Location Detector

In one embodiment, the method of which is set forth in FIG. 4, the second electronic device includes a location detector that determines the position of the PDA (step 41) using the Global Positioning System, for example. The PDA then compares its determined position to a known position of the desktop computer (step 42), which known position is stored in memory in the PDA. As the desktop computer does not usually move, its position can in most cases be known to the PDA, whereas the PDA moves by nature, hence its position must be determined. If the PDA determines that its position is within a predetermined distance (e.g., 5 feet, 110 feet, 100 feet, etc.) of the desktop computer (step 43), it then establishes a synchronization session with the desktop computer. If the portable device is not within the predetermined distance of the fixed device, then the portable device waits for a predetermined time before initiating another position determination and comparison (step 44). This ensures that the portable device will not unduly tax its power resources.

The wait determination could be based on the difference in distance from the fixed device. For example, if the two devices were only 20 feet apart, but the threshold was 10 feet, the position determination could be performed again after 10 seconds or some relatively short period of time. If the two devices were 20 miles apart, the position determination could be delayed for a relatively longer period of time, such as 20 minutes, based on for example at least the time required to traverse that distance.

Turning to FIG. 5, another exemplary embodiment of a method for detecting the proximity of a device (such as a portable computer), which should be synchronized with another device (such as a fixed computer), is depicted in flow chart form. One of the two devices (e.g., the fixed device) periodically outputs a low-level signal (step 51). The other device (e.g., the portable device) receives the low-level signal if within the predetermined range, such as 3, 5, 10, 20 or 100 feet (step 52). The recipient of the low-level signal checks to determine when the last time it responded to this low-level signal (step 53) by, e.g., determining whether a preset time has elapsed since the last response. If not, the device places the receiver in a sleep mode for a predetermined time to prevent undue use of the device's processing capability (step 54). If the preset time has elapsed since the last response, then the device transmits a higher power response indicating receipt of the low level signal and identifying itself to the sender (step 55). Processing continues in step 33 (FIG. 3).

Figure 6:
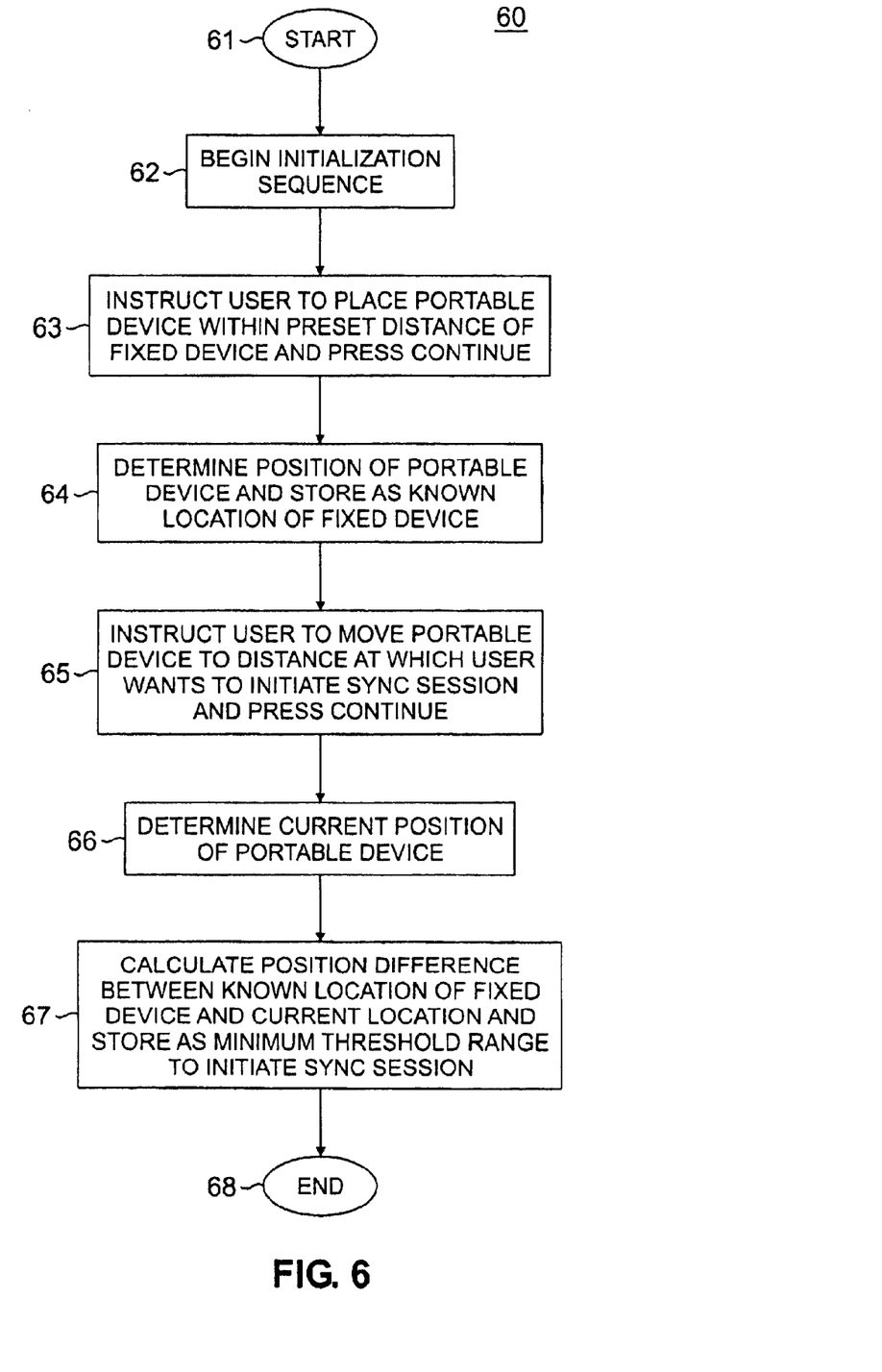
FIG. 6 depicts a flow chart of an exemplary embodiment of a method for initializing the embodiments of the present invention according to yet another aspect of the present invention.

Turning to FIG. 6, shown therein is one possible embodiment 60 for enabling the PDA to determine both the location of the PC and its own location during an initial setup session. For example, a user enters an initialization routine (step 61) that prompts the user to move the PDA to a position close (e.g., within 3 feet) to the fixed device (step 63). The user then is prompted to press a button to cause the PDA to engage the location determination circuitry, which determines the position of the fixed device by assuming the fixed device is at the same location as the PDA currently (step 64). The PDA and/or the fixed device store the fixed device's location.

In addition, the user could then be instructed to either enter manually the threshold distance at which the two devices will attempt synchronization, or to manually move the device to a position indicative of the threshold (e.g., the entrance to one's office) (step 65). In the latter scenario, the position at the threshold is determined (step 66), the position difference is calculated and stored (step 67). Then, every time the PDA comes within a user-selectable range of the stored fixed location (such as 5 feet, 10 feet, 20 feet, etc.), the PDA will attempt to establish a synchronization session with the fixed device. Moreover, the optimal transmission power at the threshold can also be determined in the exact environment during this initialization by simply automatically transmitting synchronization messages back and forth at varying power levels measuring the bit error rates and adjusting the power level to just exceed the power level to meet a minimum bit error rate. This ensures adequate transmissions without excessive power levels thereby reducing other potential interference in multi-use applications.

Authentication techniques can be used to ensure both devices are allowed to synchronize data. Moreover, limits on the time between synchronization sessions can be set to prevent overloading the two devices by constantly attempting to synchronize data.

Enabling the user to select the range that the two devices must be within before attempting to initiate synchronization allows the user to account for site-specific limitations. For example, if the desktop computer is located within a cubicle among many other cubicles, as is sometimes the case in large offices, reducing the range to 3 feet may ensure proper synchronization. Alternatively, if one wants to synchronize every time one comes home without entering the room with the desktop computer, for example, one could set the range to 100 feet, which in most cases would ensure synchronization each time one came home.

Synchronization Override

The system employs a synchronization override that prevents the devices from continuously performing synchronization simply because they remain in proximity of each other. If a synchronization session has recently been completed, such as within a last ten minutes or any user established period, the PDA does not begin the synchronization session. The user can set this parameter as part of the synchronization algorithm.

Upon receipt of a signal from the PDA indicating that the PDA wishes to synchronize information with the desktop, the desktop first authenticates the PDA before transmitting any information to prevent unauthorized access to the information. Moreover, this authentication protocol enables the use of synchronization by PDAs and desktops in a workplace environment where many PDAs attempt to synchronize with many desktops in close proximity, thereby preventing accidental override of the information. It is possible with the system of the present invention to permit multiple PDAs to synchronize with a single desktop computer, which serves as a central database for many people. For example, a single computer may be used to process orders from multiple salespeople, each bearing a PDA into which they enter orders. This enables synchronization of orders based on priority or time of entry into the system. Moreover, it may enable other salespeople to learn that a particular item in inventory is sold out before attempting to sell items that cannot be furnished.

The present invention provides a virtual hot synchronization feature for information bearing devices. As these devices have become prevalent in our information rich society, the need for ensuring one device's data remains consistent with other devices storing and/or recording similar data has grown. Yet, the techniques for ensuring this consistency have not. The present invention provides a quick, transparent and effective synchronization technique without requiring any user intervention or knowledge.

Specifically, when the opportunity presents itself, the personal digital assistant will automatically synchronize with the personal computer. A particular example is possible automatic synchronization of the PDA and PC upon entry into the home/office where the personal computer resides. According to this embodiment, when the bearer of the PDA enters the proximity of the PC, the PC (or PDA) detects the presence of the other device (i.e., the PDA or PC, respectively) and establishes a communications link between the two devices. Once the communications link is established, existing protocols and file transfer techniques compare the respective files and transfer updated files between the two devices. At the end of the communications session, the two devices contain the same files and hence the same data or information. The techniques for comparing and transferring files between the two devices are well-known, hence will not be described in detail herein.

For example, U.S. Pat. No. 5,666,530 discusses some protocols and techniques for synchronizing files between two computers. This patent is hereby incorporated by reference, as if repeated herein in its entirety. One technique employs a specific ".INI" file that stores a listing of files that need to be synchronized and which are present in both devices. During the synchronization process, the computers compare files listed in the specified ".INI" file and replace the older versions with the newer versions. Techniques to provide backup in case of accidental errors can be included, such as saving the older files in a backup directory with a date extension and saving a predetermined number of versions of the same file, such as the last three or five versions, or whatever amount fits in a user-selectable amount of dedicated memory capacity.

Another technique includes utilizing a GRP or group file as provided in Microsoft Windows® which group indicates the files and directories to be synchronized and stored. In this instance, the user first develops a SYNCHRONIZE group. Then, files, directories and dedicated programs are assigned icons. These icons are placed in the SYNCRHONIZE group. Windows® automatically alters the GRP file. The change in this special group is then transferred to the other computer. The new file or information is transferred to the other computer and added to the synchronization list. Similarly, an icon can be removed and the related file or program is removed from the synchronization list. This procedure allows simple selection and deselection from storage and synchronization.

Communications Protocols and Interfaces

A preferred embodiment communications protocol for use in the devices being synchronized includes Bluetooth protocol or the like. Bluetooth is a computing and telecommunications industry specification that describes how mobile phones, computers, and personal digital assistants can easily interconnect with each other and with home and business phones and computers using a short-range wireless connection. Using this technology, users of cellular phones, pagers, and personal digital assistants, such as the PalmPilot, can use a three-in-one phone that can double as a portable phone at home or in the office, get quickly synchronized with information in a desktop or notebook computer, initiate the sending or receiving of a fax, initiate a print-out, and, in general, have all mobile and fixed computer devices be totally coordinated. The technology requires that a low-cost transceiver chip be included in each device.

Thus, each of the two electronic devices includes a Blue-tooth compatible transceiver that handles the communications between each device. Each device is equipped with a microchip transceiver that transmits and receives in frequency band of 2.45 GHz that is available globally (with some variation of bandwidth in different countries). In addition to data, up to three voice channels are available. Each device has a unique 48-bit address from the IEEE-802 standard. Connections can be point-to-point or multipoint. The maximum range is 10 meters. Data can be exchanged at a rate of 1 megabit per second (up to 2 Mbps in the second generation of the technology). A frequency hop scheme allows devices to communicate even in areas with a great deal of electromagnetic interference. Built-in encryption and verification is provided.

Bluetooth is a wireless communication technology that allows mobile phones, PDAs, PCs and other electronic devices to talk to each other. Developed to promote the use of wireless communications worldwide, it is a specification for small form factor, low-cost, short-range radio links between a variety of portable and mobile computing devices. Detailed specifications for bluetooth can be found at http://www.bluetooth.com.

Various triggers may be used to initiate synchronization. The trigger might be blue-tooth based device recognition. Alternatively, standard proximity detection, such as that used in the Sony Felica platform, might be used to trigger synchronization. In these embodiments, something in the passageway to the home or office could initiate the sequence. Other triggers might be merely location based. Thus, cell based device location detection, GPS or other technologies could be used to provide the trigger. For example, with this embodiment, when the PDA is brought into a particular zone, the virtual hot synchronization is initiated.

Of course, data other than contacts information can be hot synchronized. Electronic commerce data, such as transaction information or coupons, might be collected on a PDA, then synchronized with the PC resident electronic commerce application, or web server through the PC. A user's task list might also be updated to add or remove tasks that had been completed during the course of the day and recorded on the PDA.

Although various embodiments are specifically illustrated and described herein, it will be appreciated that modifications and variations of the invention are covered by the above teachings and within the purview of the appended claims without departing from the spirit and intended scope of the invention. For example, while several of the embodiments depict the use of specific communication techniques and protocols between various embodiments, any communication technique will suffice to transfer information between the two devices being synchronized. Moreover, while some of the embodiments describe specific information requiring synchronization, any data and information requiring synchronization can be synchronized by the invention described herein. Furthermore, these examples should not be interpreted to limit the modifications and variations of the invention covered by the claims but are merely illustrative of possible variations.

What is claimed is:

1. A method for automatically synchronizing a first electronic device with a second electronic device comprising:

detecting automatically a proximity of the first electronic device relative to the second electronic device; wherein said step of detecting includes determining a position of a first electronic device and comparing the position to a known position of the second electronic device;

updating automatically information in the second electronic device with information in the first electronic device; wherein if the position of the first electronic device lies within a predetermined distance of the known position of the second electronic device then initiating a synchronization communications session, during which said step of updating is performed; and preventing synchronization if a predetermined time period has not expired since the last synchronization session.

2. The method according to claim 1, further comprising the step of determining whether the second electronic device is authorized to receive information from the first electronic device prior to performing the step of updating.

3. The method according to claim 1, wherein said step of detecting further comprises:

transmitting a low level signal from one of the electronic devices; and detecting the low level signal with the other of the electronic devices.

4. The method according to claim 3, wherein said step of detecting further comprises transmitting a synchronization session initiation signal in response to said detecting the low level signal.

5. The method according to claim 4, further comprising the steps of:

receiving the synchronization session initiation signal, and transmitting a signal including synchronization information in response to the receipt of the synchronization session initiation signal, said signal including synchronization information having a higher signal level than said low level signal.

6. The method according to claim 4, wherein said step of transmitting the low level signal includes transmitting the low level signal on a predetermined periodic basis.

7. The method according to claim 4, wherein said step of transmitting the low level signal includes transmitting the low level signal from the one of the electronic devices that is coupled to an AC power source.

8. An apparatus for enabling synchronization of information between a first electronic device in which the apparatus is disposed and a second electronic device comprising:

a location detector determining a position of the first electronic, wherein said step of detecting includes determining a position of a first electronic device and comparing the position to a known position of the second electronic device;

a processor coupled to the location detector and comparing the position of the first electronic device relative to a position of the second electronic device; wherein if the position of the first electronic device lies within a predetermined distance of the known position of the second electronic device then initiating a synchronization communications session, during a step of updating is performed; and a transceiver coupled to the processor and initiating a wireless communications session with the second electronic device said transceiver transmitting synchronization information between said first and second electronic devices during the wireless communications session and preventing synchronization if a predetermined time period has not expired since the last synchronization session.

9. The apparatus according to claim 8, wherein said transceiver comprises a bluetooth compatible transceiver.

10. The apparatus according to claim 8, wherein said transceiver determines whether the second electronic device is authorized to receive information from the first electronic device as part of the wireless communications session.

* * * * *

UNITED STATES PATENT AND TRADEMARK OFFICE
CERTIFICATE OF CORRECTION

PATENT NO. : 6,874,037 B1
DATED : March 29, 2005
INVENTOR(S) : Philip Michael Abram et al.

It is certified that error appears in the above-identified patent and that said Letters Patent is hereby corrected as shown below:

Column 1,
Line 61, after "e.g.,", change "one" to -- on --.

Column 3,
Line 53, first word "interconnection" change to -- interconnected --.
Line 62, after first "the", change "devices" to -- device --.

Column 5,
Line 30, after "when", insert -- was --.
Line 41, before "for", bold -- 60 --.

Column 7,
Line 56, after "in", insert -- a --.

Column 9,
Line 30, after "electronic", insert -- device --.

Column 10,
Line 16, after "device" insert -- , --.s

Signed and Sealed this

Sixteenth Day of August, 2005

JON W. DUDAS
*Director of the United States Patent and Trademark Office*